Jan. 5, 1965   D. A. FISCHLER   3,164,647
PATTERNED CAST SYNTHETIC RESIN OF INTEGRAL SHEEN
Filed Sept. 27, 1961   2 Sheets-Sheet 1
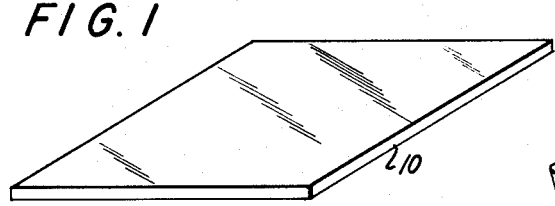
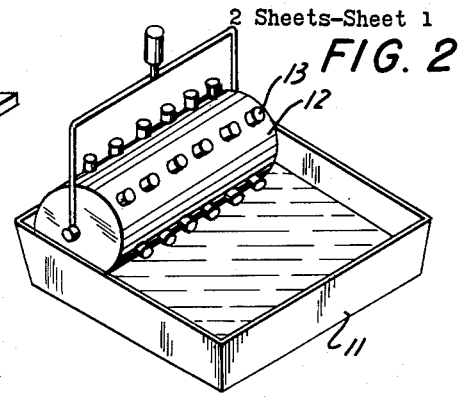
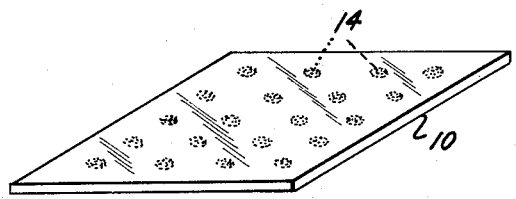
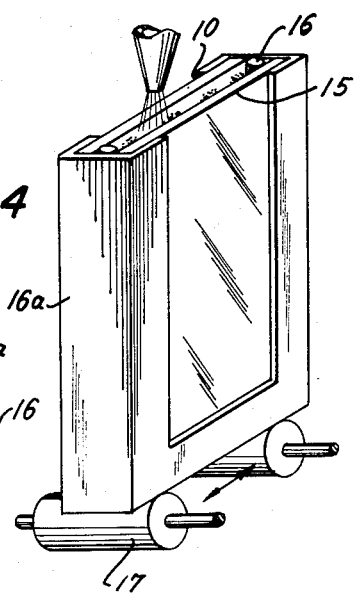
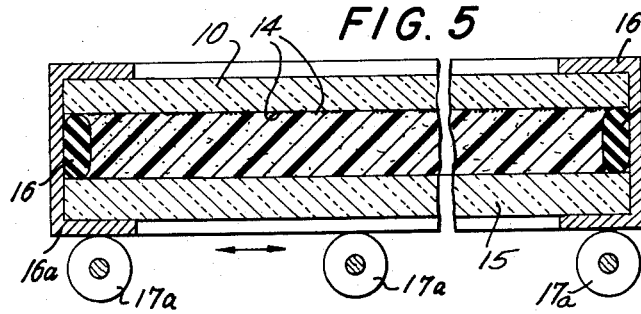
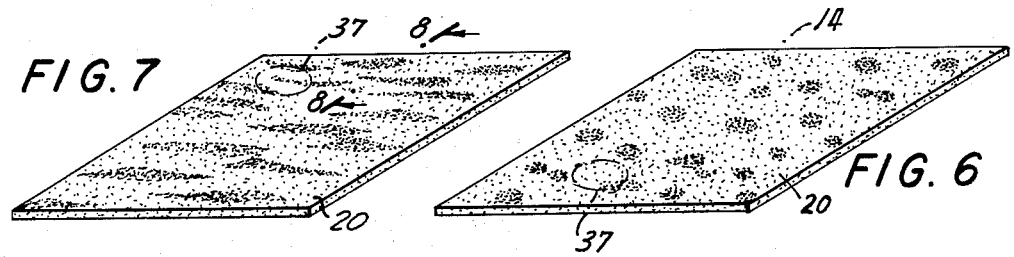
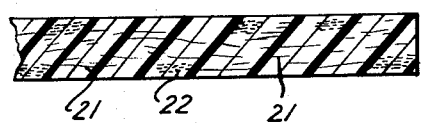
INVENTOR.
DANIEL A. FISCHLER
BY
ATTORNEY Jan. 5, 1965 D. A. FISCHLER 3,164,647
PATTERNED CAST SYNTHETIC RESIN OF INTEGRAL SHEEN
Filed Sept. 27, 1961 2 Sheets-Sheet 2

INVENTOR.
DANIEL A. FISCHLER
BY
ATTORNEY

United States Patent Office 3,164,647
Patented Jan. 5, 1965

3,164,647
PATTERNED CAST SYNTHETIC RESIN OF
INTEGRAL SHEEN
Daniel A. Fischler, New Hyde Park, N.Y., assignor
to Emsig Manufacturing Co., New York, N.Y., a
partnership
Filed Sept. 27, 1961, Ser. No. 141,146
4 Claims. (Cl. 264—108)

This invention relates to a method for casting synthetic resins, particularly more or less transparent synthetic resins having a nacreous filler to provide an integral sheen.

In my companion application there is described a method for producing cast synthetic resins having an integral sheen in which the simulation of mother-of-pearl is enhanced by nodule effects. The desirability of adding the waviness or irregularity of mother-of-pearl to the integral sheen occasioned by the incorporation of a nacreous filler in the resin is quite evident from the numerous attempts known to me to produce patterned effects of a satiny finish, highlights, among which methods are those described and illustrated in the patents to Marks No. 2,480,749, Leary No. 2,480,750, Marks No. 2,480,751, and Rogers No. 2,480,752.

Other methods known to me have attempted to reproduce the patterns or irregularity of or simulating natural mother-of-pearl, particularly in connection with transparent unsaturated polyester polymers which may be set readily to a thermo-set condition suitable for making pearl buttons, table tops, mosaics, cosmetic compact inlays. Engraved surfaces employed for this purpose are expensive. The employment of actinic rays, magnetic influences, masks, have their limitations by reason of the nature of the transparent or non-metallic casting components which are required to be employed to make such physical expedients effective.

It is an object of this invention to cast synthetic resins, and prepare sheets or blocks with an integral sheen having an integral pattern displaying satiny effects and highlights closely simulating the irregularities of natural mother-of-pearl, without limitation as to the nature of the casting surface in which the casting operation of the synthetic resin is made, to convert it from a fluid charge to a rigid, thermo-set condition.

In accordance with my discovery, I have found that during the process of orienting the nacreous filler in a resinous batch in the relatively flowable condition of the batch, contact of the resin during curing with a coating which alters the relative viscosity of the batch to influence its resistance to a shearing force may be employed to produce pattern effects throughout the thickness of the cast material, without external expensive masks, engraved molds, patterned molds, and without any limitation on the material of which the casting surface is made. This effect may be accomplished by applying the shear influencing coating in patterns of predetermined form, without otherwise altering the casting procedure, and employing smooth or altered mold surfaces.

Specifically, in one form of my invention I have discovered that by spotting the mold surface with a predetermined pattern, utilizing inhibitors, accelerators, reducers, catalysts, the shear of the resin in its distribution over the mold surfaces is altered to cause an orienting influence by reason of the differential shear in flowing or distributing the liquid resin over the mold surface. Thus, I have discovered that by altering the relative shear between the mold surface and the flowing resin during distribution of the resin, pattern effects may be obtained to give to the final sheet not only integral sheen but one in which the patterning influence is integral and extends throughout the ultimate sheet or block or the like which is formed.

Accordingly, it is an object of my invention to provide a method for casting synthetic resins having an integral sheen and provided with pattern effects by applying a deposit, coating or spotting of a predetermined pattern containing a shear controlling component so that the relative movement in distribution of the flowable batch to the casting surface will effect a differential rate of flow of said batch to the mold or supporting surface, and by reason of the differential rate of flow, differential orientation of the nacreous material is effected, resulting in an integral patterning of the nacreous component within the plastic batch.

Thus, in accordance with an object of my invention, I apply minute spottings of accelerators, inhibitors, reducers, catalysts or even slippage agents, to the mold surface to which the batch is to be applied, so that in the course of distribution, a differential rate of flow of the main body of the object with respect to the flow surface is effected, due to a differential rate of polymerization or gelling, and by such differential rate of flow, a differential rate of shear in the batch provides the ultimate body of the cured resin with an integral sheen having pleasing and aesthetic pattern effects, simulating natural mother-of-pearl.

To attain these objects and such further objects as may appear herein or be hereinafter described, and to illustrate the method of carrying out my process, I make reference to the accompanying drawing, forming a part hereof, in which—

FIGURE 1 is a perspective view of a plate forming a part of a mold cell;

FIGURE 2 is a spotting device for applying the shear control coating;

FIGURE 3 is a perspective view of a cell plate with the spotting material applied thereto;

FIGURE 4 is a perspective view illustrating one mode of charging the cell with the polymerizable plastic;

FIGURE 5 is a section therethrough in an alternative position;

FIGURE 6 is a perspective view of the sheet made in accordance with one method of casting;

FIGURE 7 is a perspective view of a sheet made in accordance with another method of casting;

FIGURE 8 is a magnified section on the line 8—8 of FIGURE 7;

Figure 9:
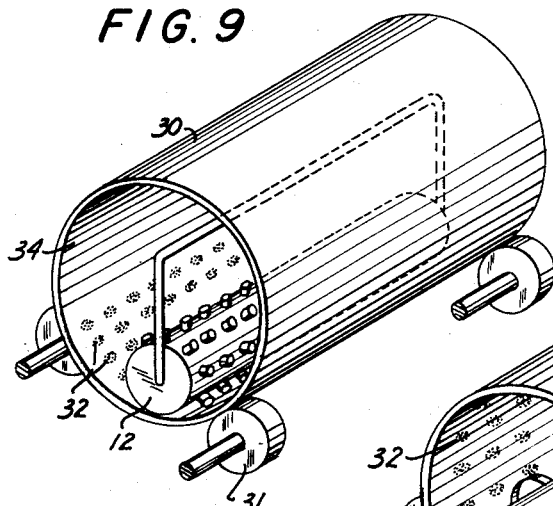
FIGURE 9 is a perspective view illustrating a method of casting by centrifugally operated drum, to illustrate the spotting step.
Figure 10:
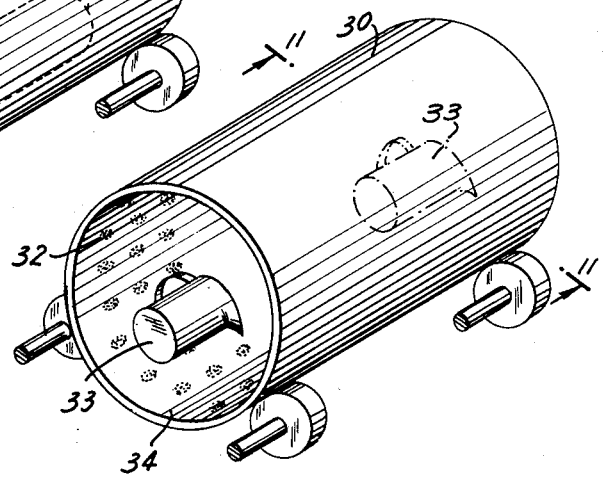
FIGURE 10 is a perspective view of the drum at the pouring stage.
Figure 11:
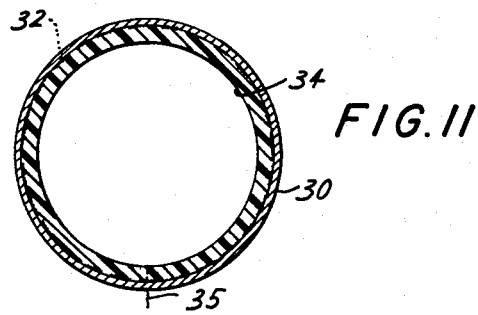
FIGURE 11 is a section taken on the line 11—11 of FIGURE 10.
Figure 13:
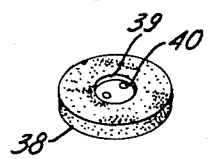
FIGURE 13 is a perspective view of a button blank punched from a sheet in accordance with FIGURE 12.

For illustrating a method in accordance with my invention, I utilize synthetic plastic which has a high order of transparency, such as the liquid, thermo-setting, unsaturated polyester resins, and in accordance with one phase of my invention, I utilize what is known as the cell method of casting wherein two plates, separated by a gasket, serve as the mold outline.

In FIGURE 1 I illustrate a plate 10, forming one component of a cell. This plate may be glass or sheet metal. Separately there is a prepared a pan 11 containing a very dilute solution of a shear controlling coating. Into the pan 11 there is dipped an applicator in the form of a pattern roll 12, having lugs 13 circumferentially therearound to outline a predetermined pattern which, for exemplification, is intended to make circular spottings.

With an applicator so provided, the applicator 12 may be rolled over the sheet 10, to leave spottings 14 of the shear controlling coating. As will be explained hereafter, the solvent for the shear controlling coating is then evaporated and the plate 10 is joined with the companion plate 15, and the gasket 16 surrounding the plate sealed on three sides by the clamps 16a. By means of a nozzle leading to a tank for a source of supply, or a pouring spout from a container, the solution of the resin is poured into the space between the plates 10 and 15, from the open side of the cell, and then the open side may be sealed or left open, depending upon the position in which the cell is used, as will appear from the description which follows.

The spacing of the plates will be in accordance with the thickness of the sheet desired—for buttons, normally a spacing of about 1/8 to 3/16 inches being suitable.

The cell so prepared in the manner known in the art, is then held in a vertical position to cause a further gravitational distribution and additionally may be edgewisely rolled over rolls 17, to give a vibratory action in the plane of the plates where a further change in pattern is desired. The degree of oscillation or vibration will be explained in connection with a more specific example.

Alternatively, the cell, after being clamped and sealed on all edges, may be horizontally extended, as shown in FIGURE 5, and may be subjected to oscillation in its own plane while in a horizontal position on the rolls 17a.

For further exemplification of a manner of practicing my invention, I provide the following:

EXAMPLE A

Part I.—To 100 parts of a general purpose styrene-modified polyester, such as Selectron 5003, made by Pittsburgh Plate Glass Co., at a viscosity of 1000 centipoises, are added:

2 parts of a nacreous pearl essence pigment. (This may be fish scales, synthetic pearl essence, such as lamellae lead carbonate of crystalline form); 2 parts of a 60% methyl ethyl ketone peroxide (commercially known as DDM, manufactured by Wallace & Tiernan); and 0.03% of 6% cobalt naphthanate solution.

Parts II.—The shear controlling deposit or coating or spotting material, consisting of 0.025% of hydroquinone in a fast drying vehicle such as acetone, is prepared separately.

With these two components in readiness, the sheet 10 has first rolled on it the shear controlling coating through the medium of the roller 12, although other means of applying the same may be employed.

The plate is then left exposed to the atmosphere, or warmed, to evaporate the solvent of acetone and leave a pattern deposit of hydroquinone crystals on the surface of the plate.

Thereupon, the plate so prepared is assembled into the cell consisting of the spaced plates 10 and 15, the peripheral gaskets, and the clamps are brought together with the seal as described, held edgewisely as shown in FIGURE 4, and filled with the flowable synthetic resinous composition exemplified in Part I of Example A to effect distribution of the polymerization plastic throughout the gap between the plates of the cell. The polymerization and curing may proceed under known conditions, depending upon the medium of curing selected.

Where it is desired to simulate the pattern of the spotting deposit effected by the roller, polymerization to the gel stage may be permitted without interruption, as the distribution in gravity flow over the spotting causes some reactive influence to the batch as the charge passes over the surface covered with the pattern of the deposit. Where, however, a change in pattern is desired, the cell is supported on the rollers 17 and is rocked in a vertical position from end to end up to about 100 cycles per minute through a distance of one foot for plates of twelve to eighteen inches square. With a composition as exemplified under Example A, Part I, the oscillation is carried on for a period of about twenty minutes, to yield a soft, rubbery or flaccid plastic sheet with a pattern of spottings integral with the orientation of the nacreous material and the cell may be opened for removal of this sheet if it is desired in this form for processing.

The sheet 20 as shown in FIGURE 6 is one in which the nacreous material at sections 11 has the pattern effect of a satiny finish, distributing the light in a dissimilar direction from the main body of the sheet. As a result of maintaining the mold stationary the pattern of the roller 12 has been produced.

Where the cell has been subjected to oscillation or rocking action vertically or in its own plane, a distribution of the pattern effect is secured as illustrated in FIGURE 7, with the satiny differential pattern integral with the thickness of the sheet in elongated form.

With the edgewise support of the cell as shown in FIGURE 4, more elongated patterns may be obtained than with the horizontal support of the cells during curing, as illustrated in FIGURE 5.

By any of the three alternatives described—that is, gravitational distribution during curing, vertical or horizontal oscillation during curing, the interface differential change in shear resistance is believed to change the flow lines of distribution, effecting a waviness during orientation of the nacreous material, as represented diagrammatically by the flow lines 21, as compared with the uniform horizontally oriented particles of nacreous material 22. A desirable aesthetic effect is produced as compared with the uniform distribution in orienting merely the nacreous material without change in the interface between the supporting surface and the charge.

As a further exemplification of my invention, I need not resort to the cell method of casting where a highly finished and polished surface need not be effected on all surfaces of the sheet or block to be made. For this purpose, I may resort to the rotary or centrifugal casting method of making pearlized material with internal sheen, exemplified in the patent to Clewell No. 2,265,226, of December 9, 1941. While the compositions therein described may be employed, one suitable for this purpose, utilizing polyester synthetic resin, is as follows:

EXAMPLE B

To 1450 grams of general purpose styrene modified polyester resin are added:

2 parts of nacreous pearl essence pigment, 0.03% cobalt naphthanate (6% metal component), 2% of a 60% methyl ethyl ketone peroxide solution.

There is separately provided a centrifugal casting machine 30 having an internal diameter of twelve inches and of sixteen inches in length, with provision for rotation about its own axis on rollers 31, and being suitably driven in a known manner to provide rotational speeds of at least 250 revolutions per minute.

The drum may have a smooth, high polished or mirrored internal surface. With a drum or barrel so provided, the pattern roller 12 as previously described is dipped into a solution of a shear controlling agent and during hand rotation of the drum 30, the interior surface of the drum is provided with spottings 32 of the shear controlling agent as described in connection with the embodiment illustrated in FIGURES 1 to 8. The solvent for the shear control agent is thereupon permitted to evaporate, with or without warming to hasten evaporation to leave a crystalline spotting of the hydroquinone.

Figure 12:
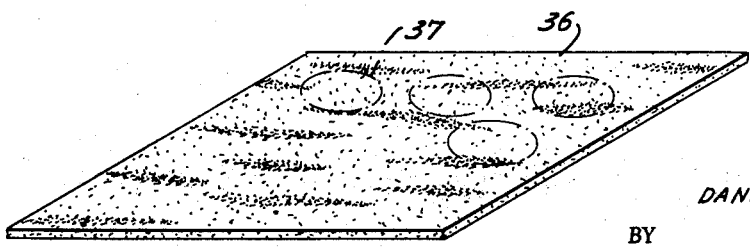
FIGURE 12 is a perspective view to illustrate the sheet made in accordance with my invention.

Thereupon, by means of a pouring container 33 and during revolution of the barrel at about 150 r.p.m., the charge 34 of the flowable polyester resin is progressively added and distributed over the interior of the barrel. Rotation is continued for a period of twenty minutes to cure the resin to the gel stage, preferably to a soft or flaccid condition, whereupon the rotation of the drum is stopped. If a partition along the generatrix of the drum has been used, the partition element is lifted to part the cylindrical deposit and remove it for flattening into a flat sheet. Otherwise, the deposit may be cut along the generatrix 35 of the cylinder and the sheet 36 removed and flattened, as shown in FIGURE 12.

Where the sheet 36 is to be formed into buttons, the button blanks may be blanked out by dieing out or stamping operations as shown along the dotted outlines 37, to produce disks 38. If the blanks have been died out in the partially cured condition, they may then be faced with the cavity 39 and then fully cured, the thread holes 40 drilled and the buttons polished, all by known procedure which need not here be described.

It will be understood that the entire sheet, after casting, may be cured to the final, thermo-set, rigid condition and with cylindrical saws, button blanks or the like cut therefrom to be finished for facing, drilling, by the methods employed in making natural mother-of-pearl buttons, or buttons from other known sources such as melamine and urea resin blanks.

The sheets 36 produced by this method will be provided with a predetermined pattern effect of integral sheen throughout the thickness of the patterned deposit, with a distribution of the outline of the pattern influenced by the rotary movement of the drum during gelation of the charge from the free flowing state.

A substantially direct duplication of the applied pattern roller deposit is effected by the minimizing of the distribution influence during curing. The greater the distribution component, the greater will be the elongation of the pattern from the form of the original deposit. In the centrifugal casting method, at higher speeds of rotation, the distortion of pattern from the form of the original roller deposit of the shear controlling agent is minimal during polymerization as distribution at the interface is minimized. With a lower rate of revolution, the effect of distribution at the interface is greater and a greater distortion effect of the pattern from the original form of the roller deposit will be achieved.

Thus, in both methods of cell casting or centrifugal casting, pattern influence may be modified, depending upon the viscosity of the composition, thickness of the sheet desired, the gel time of the composition. Accordingly, by a control of the distribution, a wide variation of patterns is attainable from a duplication of the applied pattern of the shear controlling agent or deposit applied by the pattern roller or like patterning means. Accordingly, by a control of the distribution of the flowable polymerizable synthetic plastic in relation to the spottings of the pattern, a wide variety of pattern effects of the nacreous filler from the same pattern member may be achieved.

It will also be understood that while I have described and illustrated applying the shear control agent or deposit by rolling, I may also resort to patterning by wiping, spraying, silk screen outline, to effect a deposition of the minute deposit of shear controlling agent.

While I have described and illustrated examples of styrene modified polyester resin, it will be understood that other examples of polymerizable materials will now suggest themselves, such as for example, the thermo-setting, unsaturated polyester resin in accordance with the patent to Dangelmajor, No. 2,643,943, which may be employed for distribution on the mold surface without the preferred prepolymerization suggested therein for the production of the compression molding charge.

All viscosities of resin may be employed, with the restriction that the resin must be flowable at the initial stage of distribution. Where, however, intermediate flowable resinous charges are available which may be converted to a flowable condition by the application of heat, such charges may likewise be used, with the control of distribution as soon as the resin has been converted to the flowable condition.

A wide variety of synthetic resinous compounds adapted to give a polymer solid at ordinary temperatures, having pigments for orientation, may be employed, the degree of rotation for orientation depending upon the nature of the nacreous material and the nature of the lamellae to respond to orientation, whether synthetic lamellae such as crystalline lead carbonate, or natural fish scales, to give an integral sheen by orientation in relation to the finished surface of the article.

While I have described and illustrated and prefer the thermo-set synthetic resins, it will be understood that the resin may be thermoplastic as long as there is present a shear controlling agent in the interface between the casting surface and the body of the deposit of resinous material in the mold during distribution.

Temperature conditions of operation may be employed within the limits that there be no decomposition of either the resinous charge or the shear controlling deposit which causes a change in shear during distribution of the resinous deposit on the mold surface.

Accordingly, the synthetic resin as herein denoted is one adapted to give a polymer solid at ordinary room temperatures, which may be employed in making buttons, table tops, mosaics, ornamental tiles, cosmetic appliances, such as compacts, and therefore the term "synthetic resinous material" is intended to encompass thermoplastic or thermoset materials or mixtures thereof. Examples of thermoplastic resins are polymers and co-polymers containing an ethylenic group $CH_2=C<$. Examples of monomers used to make these polymer materials are styrene and styrene with alkyl and halogen substituents on the ring and side chain such as ortho, meta and para methyl styrene, alpha methyl styrene, 2,4 dimethyl styrene, 2,3 dimethyl styrene, 2,5 dimethyl styrene, alpha chlorostyrene, bromostyrene, dichlorostyrene, etc.; esters of alpha methylene aliphatic monocarboxylic acids such as methyl acrylate, ethyl acrylate, dodecyl acrylate, 2 chloroethyl acrylate, phenyl acrylate, methyl methacrylate, ethyl methacrylate, acrylonitrile, methacrylonitrile; vinyl esters such as vinyl acetate, vinyl butyrate, etc.; vinyl ethers such as vinyl methyl ether, vinyl 2-chloroethyl ether; vinyl ketones such as vinyl methyl ketone, methyl iso-propenyl ketone; isobutylene; vinylidene halides such as vinylidene chloride; N-vinyl compounds such as N-vinyl pyrriol, N-vinyl carbazol; acrolein acrylamide, methacrylamide; allyl compounds such as allyl alcohol, allyl actate and coploymers of any of these materials.

Epoxy resins, a material containing oxirane oxygen linkages and employing various cross-linking hardeners may be employed, such as divinyl benzene, diallyl phthalate diallyl malonate, allyl methacrylate, diallyl carbonate, triallyl cyanurate, tetrallyl silane, or copolymers of these materials and mono ethylenic materials as listed earlier may be used in this process.

Combinations of these components may be made to tailor the resins to the use to be made or the machining and finishing tools, drilling, or stamping, cutting, punching, slicing, extruding or casting.

The nacreous material to secure the pearlized finish with integral sheen may include fish scale essence or synthetic light reflecting lead carbonate lamellae and may also be extended to employ the aluminum bronze lamellae, it being understood that to some degree modification in the orienting influence may be required with some change in the light reflecting lamellae which is employed, as is well known to the skilled worker.

While in the examples given I have used as the shear controlling agent spottings of hydroquinone in that this material constitutes an inhibitor, other inhibitors which may be employed are the ethers of hydroquinone, tertiary butyl catachol, potassium iodide. Other shear producing agents are accelerators such as cobalt naphthanate, trimethyl phenyl ammonium chloride, cumene hydroperoxide; catalysts such as reducers, such as tricresyl phosphite, sodium hypophosphite. Even spottings of a detergent having a petroleum component may be employed and silicone oil may likewise be employed as a spotting for the shear controlling agent.

While I have described and illustrated examples of resins which contain nacreous material for producing the integral sheen and pearlized effect influenced by the shear controlling agent, it will be understood that the resins may contain dyes and pigments for the purpose of coloring or opacifying any composition of resin, still further to striate and color the pearlized material and produce highly desirable aesthetic effects and varying physical properties in the deposit, altered by the procedure which I have described, for enhancing, by patterning, the pearlized deposition by any casting or extruding methods known in this field, where there is an interfacial differential reaction or behavior possible in distribution during gellation of the charge with regard to the mold surface notwithstanding its smooth mirrored finish.

It will also be understood that while in the interests of economy I have described and illustrated a smooth surfaced casting medium, the use of a patterned mold whether by engraving, etching or otherwise, is not precluded from the employment of the procedure described, and is intended to come within the purview of my invention.

Having thus described the invention and illustrated its use, what is claimed as new and is desired to be covered by Letters Patent is:

1. The method of molding a flowable synthetic resin compound containing nacreous filler in a form having a surface, to provide sheets or like articles shaped to conform to said surface, said articles having a patterned, pearlized finish to provide an integral sheen, comprising the steps of applying to said surface spottings of a material which will induce slippage between the surface and the resin in the area of said spottings during cure of the resin, introducing a batch of said resin compound into said form so that the resin contacts said surface, and thereafter moving said form as a unit in a direction to induce a flow of said compound with respect to said surface and to orient said filler while polymerizing said batch.

2. The method of claim 1 wherein said material comprises a polymerization inhibitor.

3. The method of claim 1 wherein said material comprises a detergent.

4. The method of claim 2 wherein said material comprises a lubricant.

References Cited in the file of this patent

UNITED STATES PATENTS

| | | |
|---|---|---|
| 2,856,635 | Gerson et al. | Oct. 21, 1958 |
| 3,010,158 | Broderson | Nov. 28, 1961 |